Jan. 12, 1954     N. F. ANDREWS     2,665,538
CORN HARVESTER
Filed Nov. 6, 1950
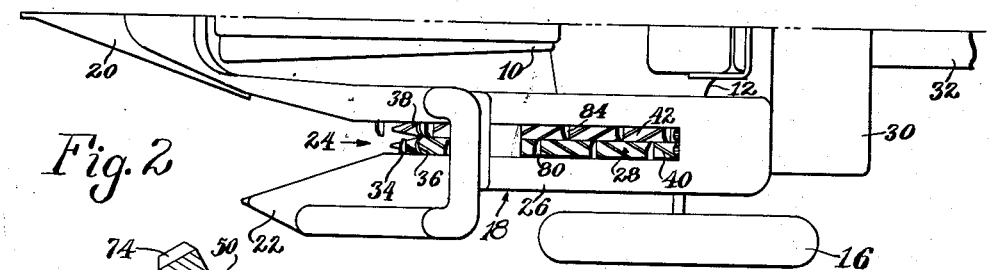
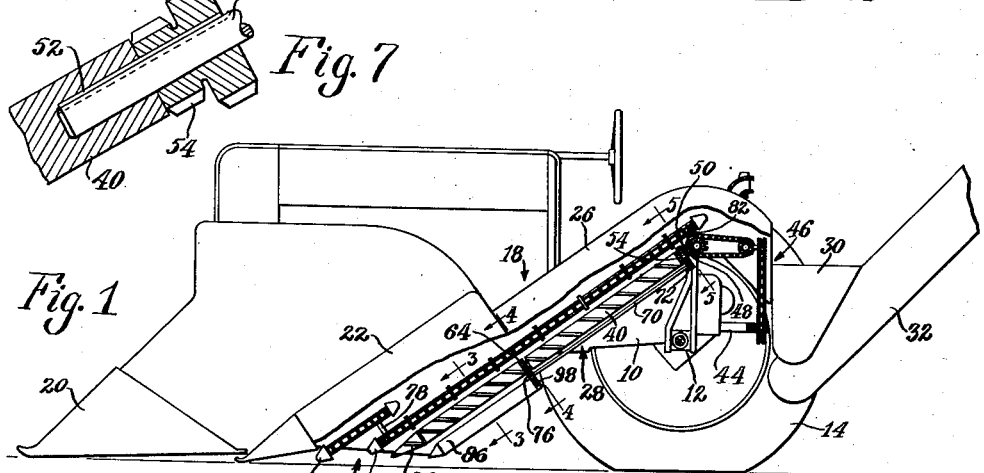
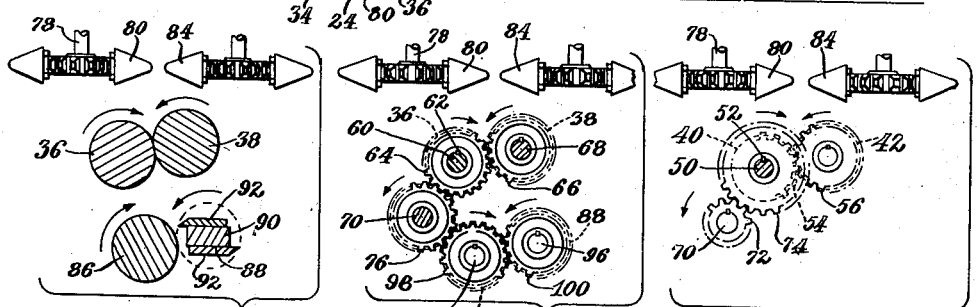
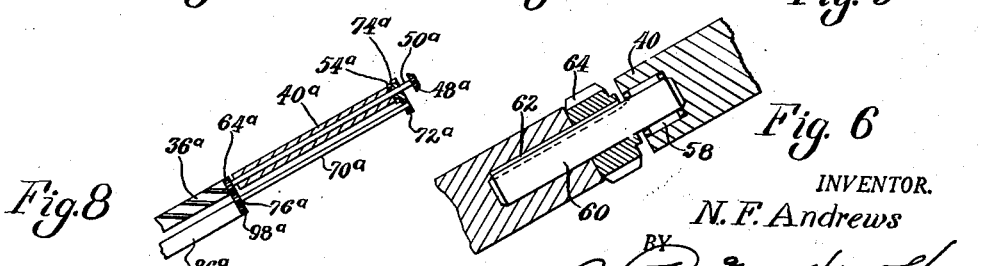
INVENTOR.
N. F. Andrews
Attorneys Patented Jan. 12, 1954

2,665,538

UNITED STATES PATENT OFFICE 2,665,538

CORN HARVESTER

Norman F. Andrews, Ankeny, Iowa, assignor to Deere Manufacturing Co., Dubuque, Iowa, a corporation of Iowa Application November 6, 1950, Serial No. 194,356

16 Claims. (Cl. 56—111)

This invention relates to a corn harvester and more particularly to means for driving the snapping and husking rolls thereof.

A corn harvester of the type to which reference will be made herein normally comprises a fore-and-aft extending supporting structure or frame carried by wheels for movement over a field of standing corn stalks. A fore part of the frame carries a pair of snapping rolls for snapping the ears of corn from the stalks. A rear part of the machine carries one or more pairs of husking rolls to which the snapped ears are delivered. The husking rolls operate to remove the husks from the ears. During the many years of development of and experimentation with corn-picking machinery, certain optimum speeds of rotation for both the snapping rolls and the husking rolls have been determined, based upon their particular requirements. For example, the snapping rolls are relatively high-speed rolls and the husking rolls are relatively low-speed rolls, because the former must function to snap ears from the stalks, while the latter find a different function in removing husks from the ears.

In any type of corn picker, there exists a problem involving the transfer of snapped ears from the snapping rolls to the husking rolls. In the simplest form of design, the husking rolls will be disposed rearwardly of and respectively coaxial with the snapping rolls, so that a clear and unobstructed path may be had for effecting transfer of the ears upwardly and rearwardly. In machines of this type, it has heretofore been the practice to make each snapping roll and its companion husking roll as a substantially unitary assembly, with the result that the proper differential in speeds could not be obtained between the snapping and husking rolls. Accordingly, a compromise between the relatively high optimum speed of the snapping roll and the relatively low speed of the husking roll had to be made. In other cases, the optimum differential speeds were obtainable in a construction in which lateral offset was provided between the axes of the snapping and husking rolls, so that each pair of rolls could be separately driven at the required different speeds.

According to the present invention, coaxial snapping and husking rolls are provided. Mechanism is arranged to drive these rolls at different speeds, regardless of their coaxiality. It is a feature of this invention that the driving mechanism is comparatively simple and compact, in that relatively few driving elements, such as gears, are used, together with relatively few driving shafts. In one form of the invention, one of the husking rolls is driven directly and an external shaft is utilized to transmit power to the snapping rolls at a different speed ratio. In another form of the invention, the driving shaft extends loosely through one of the husking rolls and has a direct connection to the snapping roll. An external shaft paralleling the husking rolls is utilized to transmit power at a different speed ratio to the husking rolls. It is an important object of the invention to utilize a design of driving mechanism of such nature that the basic characteristics of corn harvester construction are not altered. Therefore, the improved driving mechanism and snapping and husking rolls associated therewith may be utilized in the design of a conventional corn harvester or may be provided as an attachment for harvesters of existing types.

The foregoing and other important objects and desirable features inherent in and encompassed by the invention will become apparent from the following detailed description and accompanying sheet of drawings in which Figure 1 is a side elevational view, partly in section, of a tractor-mounted corn picker, the near rear wheel of the tractor having been removed to expose internal structure;

Figure 2 is a plan view of the arrangement shown in Figure 1, only that portion of the machine at one side of its longitudinal centerline appearing in the view;

Figures 3, 4 and 5 are respectively transverse sectional views, each on an enlarged scale, taken respectively on the lines 3—3, 4—4 and 5—5 of Figure 1;

Figure 6 is an enlarged fragmentary central longitudinal sectional view showing the relationship between a snapping roll and a companion husking roll in one form of the invention;

Figure 7 is an enlarged fragmentary longitudinal sectional view showing the upper end portion of one husking roll and the driving shaft therefor; and Figure 8 is a representative view, partly in section, illustrating a modified form of the invention shown in Figures 1 through 7.

The harvester construction chosen for the purposes of disclosing the present invention is of the tractor-mounted type; although, it will be obvious that the principles of the invention are applicable to harvester designs of many types. Accordingly, the present disclosure should be taken as illustrative and not limiting.

The harvester machine comprises a tractor having a longitudinal body or frame 10 carried at its rear end on a transverse axle structure 12 in turn supported at its opposite ends by traction wheels 14 and 16. The wheel 16 is omitted from the view in Figure 1 and the wheel 14 is omitted from Figure 2. The forward end of the tractor body is supported on a steerable front truck (not shown) as is conventional.

The corn harvester comprises what may be generally termed fore-and-aft extending supporting structure designated here generally by the numeral 18. This structure includes a center divider 20 embracing the forward end of the tractor and an outer divider 22 covering gathering mechanism designated generally by the numeral 24. Rearwardly and upwardly inclined shield or housing structure 26 is disposed in substantial longitudinal alinement with and rearwardly of the outer divider 22 and encloses husking mechanism, here designated generally by the numeral 28. Standing corn gathered by the gathering mechanism 24 is transferred to the husking mechanism 28 to be husked, and husked ears are delivered rearwardly from the husking mechanism to a hopper 30, whence the husked ears are carried by a wagon elevator 32 for delivery to a wagon or truck operating behind the harvester, as is conventional. The various details have not been illustrated, since familiarity therewith will be assumed.

Included in the harvester supporting structure 18 are various frame members and bearings (not shown) for supporting the gathering and husking mechanisms. The gathering mechanism includes, among other things, a rearwardly moving gathering chain 34 for facilitating the movement of standing corn stalks between a pair of parallel, upwardly and rearwardly inclined snapping rolls 36 and 38. These snapping rolls have terminal rear end portions proximate to front end portions of a pair of parallel, rearwardly and upwardly inclined husking rolls 40 and 42. These husking rolls are respectively coaxial with the snapping rolls and the forward ends thereof are spaced axially from the rear ends of the snapping rolls. The rear ends of the husking rolls are, of course, remote from the rear ends of the snapping rolls. Both pairs of rolls are driven from power-input means carried by the tractor and normally rotatable at a constant speed. In the present case, as is typical, the tractor includes a rearwardly extending power take-off shaft 44 from which drive is taken by suitable chain and sprocket means, indicated generally by the numeral 46, to a bevel pinion 48, which may be herein referred to as a power-input member.

The bevel pinion 48 is keyed to or otherwise fixed for rotation on a driving shaft 50 coaxial with the husking roll 40. A typical arrangement is shown in Figure 7, wherein a key 52 is utilized to directly connect the forward end of the driving shaft 50 to the husking roll 40. See also Figure 5. In this manner, the husking roll 40 is directly driven by the power-input means 44—46—48. In this form of the invention, the shaft 50 is driven by the input means at an optimum speed on the order of 350 R. P. M. Therefore, the husking roll 40 will be driven at the same speed. In some cases, the mating husking roll is driven by the driven husking roll solely because of the presence of ears and husks handled by the rolls. In other cases, the two rolls may be positively interconnected by meshing gears so that one roll drives the other. The latter arrangement is illustrated here. For that reason, the shaft 50 and key 52 serve to mount a coaxial gear or pinion 54 which is in constant mesh with a similar gear or pinion 56 keyed to or otherwise fixed for rotation with the other husking roll 42 (Figure 5).

Since the optimum speed of rotation of the snapping rolls 36 and 38 should considerably exceed that of the husking rolls 40 and 42, it is expedient that the snapping rolls be mounted for rotation relative to the husking rolls. An arrangement of this type is illustrated in Figure 6, wherein it is shown that the forward end of the husking roll 40 is recessed to carry a bearing, such as a roller bearing 58, for journaling the rear end of a short shaft 60. The forward end of this shaft enters the rear end of the coaxial snapping roll 36 and is keyed thereto by a key 62. It will be understood, of course, that the driving connection between the shaft 60 and snapping roll 36 may be otherwise effected. In any event, the shaft 60 constitutes means for inter-journaling the coaxial snapping and husking rolls 36 and 40 for relative rotation of the rolls. The other coaxial snapping and husking rolls 38 and 42 may be similarly mounted. Normally, the snapping rolls are inter-geared for rotation at the same speed but in relatively opposite directions. For this purpose, the present disclosure includes the utilization of a gear or pinion 64 keyed by the key 62 to the shaft 60. This gear is in constant mesh with a similar gear or pinion 66 keyed to a shaft 68 for the other snapping roll 38 (Figure 4).

In order to accomplish driving of the snapping rolls 36 and 38 at the desired speed and from the driving shaft 50, there is provided driving mechanism including an elongated drive member in the form of a driven shaft 70 running lengthwise of or parallel to the husking rolls 40 and 42. This shaft has its rear end adjacent the rear ends of the husking rolls and its forward end adjacent the rear ends of the snapping rolls. Driving means at the rear end of this shaft and at the rear end of the husking roll 40 comprises drive gearing including a pinion 72 keyed to the shaft 70 and a gear 74 keyed to the driving shaft 50. The pinion 54 and gear 74 may be an integral unit keyed by the key 52, as shown in Figure 7. The gear 74 is substantially twice as large as the pinion 72, so that the gear ratio is approximately two to one, wherefore the shaft 70 will be driven at a speed twice that of the shaft 50. The forward end of the shaft 70 has keyed thereto a pinion 76 which meshes with the snapping roll gear 64 (Figure 4). The gears or pinions 76 and 64 are of the same size so that the snapping rolls are driven at the same speed as the shaft 70. These gears (64 and 76) thus constitute driving mechanism or means at the forward end of the elongated driven shaft 70. As previously stated, the drive means 72—74 at the opposite end of the shaft 70 includes the step-up ratio. It will be understood, of course, that the ratio mechanism could be at the opposite end. In any event, the driving means at opposite ends of the shaft 70 are relatively simple and comprise relatively few parts. If it is desired to omit the pinions or gears 54 and 56, this may be done without affecting rotation of the husking roll 40 and the snapping rolls 36 and 38, in which case dependence will be had upon the material engaged by the husking rolls for establishing a drive between the rolls, which is not unconventional.

The drawings illustrate representative means for accomplishing the transfer of ears of corn from the snapping rolls to the husking mechanism. The gathering chain 34 is carried by sprockets as is usual, and one of these sprockets includes a downwardly and rearwardly inclined shaft 78 which carries a sprocket about which is trained the forward loop of an endless conveyor chain 80. The rear loop of this chain is trained about a sprocket carried on a shaft 82 driven by the means 46. A companion endless chain 84 (Figure 2) may be provided in addition to the chain 80. This is a matter of choice and does not affect the present invention.

Another feature of the invention resides in the provision of what may be termed chopping rolls 86 and 88 located below the snapping rolls 36 and 38 (Figures 1 and 3). The chopping roll 86 is preferably in the form of an elongated smooth roller of wood or equivalent material. The other roll is rather an element comprising a center member 90 and a pair of fixed knives 92.

The principle of operation involved is that as the machine progresses over the field of standing stalks, the stalks enter between the rolls 36—86 and 38—88. The directions of rotation of the rolls are indicated in Figure 3, from which it will be seen that the rolls 88 and 86 operate to seize the stalks and pull them downwardly. Ears on the stalks will be engaged above the snapping rolls 36 and 38. In a construction of this kind, the snapping rolls may be made much less agressive, eliminating considerable shelling of ears as has been experienced in the past. The rolls 86 and 88 are preferably driven at the same speed as the snapping rolls 36 and 38. As previously stated, the optimum speed of the husking rolls is about 350 R. P. M. Because of the 2-to-1 step-up ratio at 74—72, the speed of rotation of the snapping rolls will be 700 R. P. M. The rolls 86 and 88 are carried respectively by shafts 94 and 96 and to these shafts are respectively keyed a pair of meshing gears 98 and 100 (Figure 4). The gear or pinion 98 meshes with the gear or pinion 76 at the front end of the driven shaft 70. The gears 98 and 100 are of the same size and are equal in size to the gears or pinions 76, 64 and 66. Therefore, the speed and directions of rotation of the rolls 86 and 88 will be the same as those of the snapping rolls 36 and 38.

From the foregoing description, it will be seen that the shaft 50, connected to the husking roll 40, constitutes a rotatable driving member coaxial with one roll of one pair of rolls. One end of the shaft 50 is connected to the input means and the other end thereof has a direct connection to an end of one of the rolls, in this particular case, the husking roll 40. The elongated drive element or driven shaft 70 extends from the driven end of the roll 40 to an end of the snapping roll 36. This shaft has driving connections at each end thereof, and one of the driving connections includes speed-proportioning means for causing driving of the snapping roll at a speed different from (here higher than) the speed of rotation of the husking roll.

In the modified form of the invention shown in Figure 8, the same principles are involved. Although this form of the invention is illustrated in a single figure, the arrangement whereby it may be incorporated into the structure of Figures 1 and 2 is thought to be obvious. The distinguishing feature in this form of the invention is that it may be used where the input means rotates at a higher speed. For example, the input means may have a speed of 700 R. P. M., which is consistent with the optimum speed of the snapping rolls but which is too high for the optimum speed of the husking rolls. Therefore, the speed - reduction or speed - proportioning means will be somewhat different. As shown in Figure 8, a bevel pinion 48a is keyed to a driving shaft 50a which extends loosely through a longitudinal bore in a husking roll 40a of a pair of husking rolls similar to the rolls 40 and 42. The forward end of the shaft 50a is directly connected to and for rotation with the rear end of a snapping roll 36a. This snapping roll is one of a pair similar to the rolls 36 and 38. The companion roll to the roll 36a may be driven by and at the same speed as but in an opposite direction from the roll 36a by meshing gears or pinion similar to the pinions or gears 64—66. Such pinions in the modified form are represented generally by the numeral 64a. The husking roll 40a and its companion roll (not shown) may be inter-geared by a pair of gears or pinions similar to those shown at 54 and 56. In Figure 8, this arrangement is represented by the numeral 54a.

Since the shaft 50a extends loosely and coaxially through the husking roll 40a for direct connection to the snapping roll 36a, the snapping roll 36a and husking roll 40a have relative rotation, the shaft 50a serving as the means for mounting the two in this manner. In order that the husking roll 40a and its companion roll (not shown) may be driven at a speed one half that of the snapping roll 36a, there is provided an elongated drive element or driven shaft 70a having at its front end a driving connection with the gear 54a, which driving connection includes a meshing gear or pinion 76a. A driving connection at the rear end of the shaft 70a includes a gear or pinion 72a in mesh with a larger gear 74a connected to the husking roll 40a for rotation therewith. As shown, the gears 54a and 74a may be integral and may be loosely mounted on the shaft 50a. The gear 72a is substantially one half as large as the gear 74a, giving a gear reduction of one to two. The gear 76a at the front end of the shaft 70a is preferably of the same size as the gear 64a for the snapping roll 36a. Hence, the husking roll 40a will be driven at a speed one half that of the snapping roll 36a.

The modified form shown in Figure 8 also incorporates therein a pair of chopping rolls, only one of which is indicated at 86a. A companion roll, such as the roll 88, may be utilized. The roll 86a has keyed to the rear end thereof a gear or pinion 98a of the same size as and in mesh with the gear 76a at the front end of the driven shaft 70a, wherefore the roll 86a and its companion roll (not shown) will be driven at the same speed as the snapping roll 36a.

Both forms of the invention are characterized by a compact organization of driving components that is suitable for differential speeds of operation for related snapping and husking rolls, without the use of complicated gear transmissions or separate chain drives or the like. The common characteristic of both is the driving shaft that is coaxial with one of the rolls of one of the pairs, together with the external shaft such as 70 or 70a which has the driving connections including gearing, one of these connections including speed-proportioning means arranged in accordance with the speed of rotation of the initial source of power, as the power-input member 48 or 48a to which the shaft 50 or 50a is respectively connected.

Various other features of the invention not specifically enumerated herein will undoubtedly occur to those versed in the art, as likewise will numerous modifications and alterations in the preferred embodiments of the inventions disclosed, all of which may be achieved without departing from the spirit and scope of the invention as defined in the appended claims.

What is claimed is:

1. In a corn harvester having fore and aft extending supporting structure and power-input means rotatable at a constant speed: snapping and husking mechanism, comprising a pair of parallel snapping rolls arranged for rotation at a fore part of the supporting structure and inclined upwardly and rearwardly from substantially transversely alined front ends to substantially transversely alined rear ends; a pair of upwardly and rearwardly inclined husking rolls respectively coaxial with the snapping rolls and having front ends respectively proximate to and rear ends respectively remote from the rear ends of the snapping rolls; means for journaling the two pairs of rolls to provide for rotation of the husking rolls relative to the snapping rolls; a rotatable driving member coaxial with one roll of one pair of rolls and having opposite end portions; means at one end portion of the driving member for connection to the input means to effect rotation of the driving member at a predetermined constant speed; means at the other end portion of the driving member for direct connection to an end of one roll of one pair to drive said one roll at the speed of the driving member; an elongated drive element extending from the driven end of said one roll lengthwise as respects the rolls to a remote end of a roll in the other pair of rolls; a driving connection between the drive element and said driven end of said one roll; a second driving connection between the drive element and said remote end of said roll of the other pair of rolls; and speed-proportioning means in one of said drive connections for causing driving of said roll of the other pair of rolls at a speed different from the speed of the driving member.

2. The invention defined in claim 1, further characterized in that: a pair of meshing gears of the same size are positioned intermediate the rear ends of the snapping rolls and the front ends of the husking rolls and are respectively coaxial with and drivingly connected to the snapping rolls for causing driving of the snapping rolls at the same speed but in relatively opposite directions; and one of the drive connections of said elongated drive element includes a gear meshing with one of said pair of gears.

3. The invention defined in claim 1, further characterized in that: a pair of meshing gears of the same size are positioned at the rear ends of the husking rolls and are respectively coaxial with and drivingly connected to said husking rolls for causing driving of the husking rolls at the same speed but in relatively opposite directions; and one of the drive connections of said elongated drive element includes a gear meshing with one of said pair of gears.

4. The invention defined in claim 1, further characterized in that: the direct connection from the driving member is effected at the rear end of one husking roll; the elongated drive element extends forwardly from said rear end of the one husking roll to the rear end of one snapping roll; and said driving connections are respectively effected at said rear end of the one husking roll and said rear end of the one snapping roll.

5. The invention defined in claim 1, further characterized in that: the driving member is elongated and extends loosely coaxially through one husking roll from the rear end thereof to the rear end of the coaxial snapping roll; the direct connection from said driving member is effected with said rear end of the coaxial snapping roll; the elongated drive element extends back from said rear end of the coaxial snapping roll and alongside said one husking roll to the rear end of said one husking roll; and said driving connections are respectively effected at said rear ends of said coaxial snapping and husking rolls.

6. The invention defined in claim 1, further characterized in that: a third pair of parallel rolls is positioned to parallel and lie substantially coextensive with the snapping rolls; and drive means is provided from one snapping roll to one roll of said third pair to drive said one roll of the third pair at the same speed as the snapping rolls.

7. The invention defined in claim 1, further characterized in that: a third pair of parallel rolls is positioned to parallel and lie substantially coextensive with the snapping rolls; and drive means is provided from the elongated drive element to one roll of said third pair to drive said one roll of the third pair at the same speed as the snapping rolls.

8. The invention defined in claim 1, further characterized in that: a pair of meshing gears of the same size are positioned respectively coaxially with and drivingly connected respectively to the snapping rolls intermediate the rear ends of the snapping rolls and the front ends of the husking rolls; one of the drive connections of said elongated drive elements includes a gear meshing with one of said gears; a third pair of parallel rolls in positioned adjacent one pair of the first mentioned pairs of rolls; and one roll of said third pair of rolls having a gear meshing with said drive element gear.

9. The invention defined in claim 1, further characterized in that: a pair of meshing gears of the same size are positioned respectively coaxially with and drivingly connected respectively to the snapping rolls intermediate the rear ends of the snapping rolls and the front ends of the husking rolls; one of the drive connections of said elongated drive elements includes a gear meshing with one of said gears; a third pair of parallel rolls is positioned adjacent and parallel to the snapping rolls; a pair of meshing gears of the same size are respectively coaxial with and respectively drivingly connected to the rolls of said third pair, and one of the gears of the last mentioned pair of gears is in mesh with the drive element gear; and said snapping roll gears, said drive element gear, and said last mentioned gears are proportioned so that the snapping rolls and the rolls of said third pair of rolls are caused to rotate at the same speed.

10. The invention defined in claim 1, further characterized in that: the means for journaling the husking rolls and snapping rolls for relative rotation includes a drive shaft coaxial with and keyed to one roll and extending loosely into a coaxial roll; and said shaft has fixed thereto a gear forming part of one of the drive connections to the elongated drive element.

11. The invention defined in claim 10, further characterized in that: the companion roll to the roll to which the drive shaft is fixed has a second gear fixed thereto and in mesh with said first gear; and said drive connection of which the first gear forms a part includes a third gear in mesh with but one of the gears of said companion rolls.

12. The invention defined in claim 11, further characterized in that: a third pair of rolls parallels the rolls of the first mentioned pairs and includes meshing gears; and one of said meshing gears of the third pair of rolls is in mesh with said third gear of the aforesaid driving connection.

13. In a corn harvester having fore and aft extending supporting structure and power-input means rotatable at a constant speed: snapping and husking mechanism, comprising a pair of parallel snapping rolls arranged for rotation at a fore part of the supporting structure and inclined upwardly and rearwardly from substantially transversely alined front ends to substantially transversely alined rear ends; a pair of upwardly and rearwardly inclined husking rolls respectively coaxial with the snapping rolls and having front ends respectively proximate to and rear ends respectively remote from the rear ends of the snapping rolls; means for journaling the two pairs of rolls to provide for rotation of the husking rolls relative to the snapping rolls; a rotatable driving shaft coaxial with one roll of one pair of rolls and having opposite end portions; means at one end portion of the driving member for connection to the input means to effect rotation of the driving member at a predetermined constant speed; means at the other end portion of the driving member for direct connection to an end of one roll of one pair to drive said one roll at the speed of the driving member; a driven shaft rotatable on an axis paralleling the axes of the rolls and having an end portion proximate to an end of said driven roll and an end portion proximate to an end of that roll in the other pair of rolls that is coaxial with said driven roll; a driving connection between one end of the driven shaft and said driven roll; a second driving connection between the driven shaft and said coaxial roll; and speed-proportioning means in one of said drive connections for causing driving of said coaxial roll at a speed different from the speed of the driven roll.

14. In a corn harvester having fore and aft extending supporting structure and power-input means normally rotatable at a speed: snapping and husking mechanism, comprising a pair of parallel snapping rolls arranged for rotation at a fore part of the supporting structure and inclined upwardly and rearwardly from substantially transversely alined front ends to substantially transversely alined rear ends; a pair of upwardly and rearwardly inclined husking rolls respectively coaxial with the snapping rolls and having front ends respectively proximate to and spaced axially rearwardly from the rear ends of the snapping rolls, said husking rolls further having rear ends remote from said front ends; a pair of stub shafts coaxial with and fixed respectively to the rear ends of the snapping rolls and extending respectively into and journaled in the front ends of the husking rolls to interjournal the snapping and husking rolls for relative rotation; a pair of meshing gears fixed respectively to and coaxial with the stub shafts in the space between the front ends of the husking rolls and the rear ends of the snapping rolls for causing rotation of the snapping rolls at the same speed and in relatively opposite directions; a second pair of meshing gears respectively coaxial with and fixed to the rear ends of the husking rolls for causing rotation of the husking rolls at the same speed and in relatively opposite directions; means for drivingly connecting the rear end of one husking roll to the power input means to drive the husking rolls at a predetermined constant speed; a driven shaft running parallel to one husking roll and extending from the rear end of said one husking roll to the rear end of the coaxial snapping roll; drive gearing at the rear end of the shaft meshing with a husking roll gear; drive gearing at the front end of the shaft meshing with a snapping roll gear; and the gearing at one end of said shaft being so proportioned as to drive the snapping rolls at a speed higher than the speed of the husking rolls and so arranged as to drive each snapping roll in the same direction as its coaxial husking roll.

15. In a corn harvester having fore and aft extending supporting structure and power-input means rotatable at a constant speed: snapping and husking mechanism, comprising a pair of parallel snapping rolls arranged for rotation at a fore part of the supporting structure and inclined upwardly and rearwardly from substantially transversely alined front ends to substantially transversely alined rear ends; a pair of upwardly and rearwardly inclined husking rolls respectively coaxial with the snapping rolls and having front ends respectively proximate to and spaced axially rearwardly from the rear ends of the snapping rolls, said husking rolls further having rear ends remote from said front ends; a pair of stub shafts coaxial with and fixed respectively to the rear ends of the snapping rolls and extending respectively into and journaled in the front ends of the husking rolls to interjournal the snapping and husking rolls for relative rotation; a gear fixed to and coaxial with one of the stub shafts in the space between the front ends of the husking rolls and the rear ends of the snapping rolls; a second gear coaxial with and fixed to the rear end of one of the husking rolls; means for drivingly connecting the rear end of said one husking roll to the power input means to drive said one husking roll at a predetermined constant speed; a driven shaft running parallel to said one husking roll and extending from said husking roll gear to the snapping roll gear; drive gearing at the rear end of the shaft meshing with said husking roll gear; drive gearing at the front end of the shaft meshing with said snapping roll gear; and the gearing at one end of said shaft being so arranged and proportioned as to drive said snapping roll in the same direction as said husking roll but at a speed higher than the speed of said husking roll.

16. In a corn harvester having fore and aft extending supporting structure and power-input means rotatable at a constant speed: snapping and husking mechanism, comprising a pair of parallel snapping rolls arranged for rotation at a fore part of the supporting structure and inclined upwardly and rearwardly from substantially transversely alined front ends to substantially transversely alined rear ends; a pair of upwardly and rearwardly inclined husking rolls respectively coaxial with the snapping rolls and having front ends respectively proximate to and rear ends respectively remote from the rear ends of the snapping rolls; means for journaling the two pairs of rolls to provide for rotation of the husking rolls relative to the snapping rolls; first drive means for driving connection to the input means and to one roll of one pair of rolls for driving said one roll at a predetermined constant speed; and drive means including a drive member rotatable on an axis lengthwise of the rolls and drivingly connecting the first drive means and one roll of the other pair of rolls for driving said last mentioned roll at a speed different from said normally constant speed.

NORMAN F. ANDREWS.

References Cited in the file of this patent

UNITED STATES PATENTS

| Number | Name | Date |
|---|---|---|
| 1,116,278 | Hollis | Nov. 3, 1914 |
| 1,253,611 | Locer | Jan. 15, 1918 |
| 1,424,060 | Zeier | July 25, 1922 |
| 2,234,447 | Norman | Mar. 11, 1941 |
| 2,239,899 | Nightenhelser et al. | Apr. 29, 1941 |

FOREIGN PATENTS

| Number | Country | Date |
|---|---|---|
| 847,382 | France | June 26, 1939 |